US012634326B2

(12) United States Patent
Leigh et al.

(10) Patent No.:     US 12,634,326 B2
(45) Date of Patent:        May 19, 2026

(54) SYSTEMS AND METHODS FOR CLOUD SERVICE SECURITY RISK ASSESSMENT

(71) Applicant: Capital One Services, LLC, McLean, VA (US)

(72) Inventors: David Jonathan Leigh, Warrenton, VA (US); Mohammed Golam Sorwar, Alexandria, VA (US); Sreenarayan Ashok Kumar, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 168 days.

(21) Appl. No.: 18/508,887

(22) Filed: Nov. 14, 2023

(65) Prior Publication Data

US 2025/0159013 A1      May 15, 2025

(51) Int. Cl.
H04L 9/40             (2022.01)

(52) U.S. Cl.
CPC ...... H04L 63/1433 (2013.01); H04L 63/1441 (2013.01)

(58) Field of Classification Search
CPC ...................... H04L 63/1433; H04L 63/1441
See application file for complete search history.

(56) References Cited

U.S. PATENT DOCUMENTS

| | | | |
|---|---|---|---|
| 11,763,006 B1* | 9/2023 | Rao ...................... H04L 63/1433 726/25 |
| 2015/0350174 A1 | 12/2015 | Reno et al. |
| 2017/0118239 A1* | 4/2017 | Most ...................... H04L 67/10 |
| 2019/0334943 A1* | 10/2019 | Arvanites ............. H04W 4/023 |
| 2021/0352097 A1* | 11/2021 | Vlahovic .............. H04L 63/102 |
| 2023/0120174 A1* | 4/2023 | Seck ................... H04W 12/122 726/25 |
| 2024/0403444 A1* | 12/2024 | Jeevagunta ........... G06F 21/577 |

* cited by examiner

*Primary Examiner* — Beemnet W Dada
(74) *Attorney, Agent, or Firm* — Harrity & Harrity, LLP

(57) ABSTRACT

In some implementations, a system receives a request to assess security risk associated with a cloud service. The system identifies, based on the request, one or more application programming interface (API) actions associated with the cloud service. The system determines respective security category information for the one or more API actions and/or respective security risk scores for the one or more API actions. The system generates, based on the respective security category information and/or the respective security risk scores, security risk mitigation information. The system causes, based on the security risk mitigation information, one or more actions to be performed. As an example, the system may send the security risk mitigation information to a device, which may allow for presentation of the security risk mitigation information or implementation of code that is included in the security risk mitigation information.

20 Claims, 6 Drawing Sheets

104

Identify one or more API actions associated with the cloud service

Security Risk Analysis System

102

Send a request to assess security risk associated with a cloud service

Cloud Service

API Action A
API Action B
API Action C
...

API Action N

Example API Actions

Device

100

SYSTEMS AND METHODS FOR CLOUD SERVICE SECURITY RISK ASSESSMENT

BACKGROUND

An application programming interface (API) is a set of rules and/or protocols that allows different software programs to communicate and interact with each other. An API can define the methods and data formats that software programs can use to request and exchange information.

SUMMARY

Some implementations described herein relate to a system for cloud service security risk assessment. The system may include one or more memories and one or more processors communicatively coupled to the one or more memories. The one or more processors may be configured to receive a request to assess security risk associated with a cloud service. The one or more processors may be configured to identify, based on the request, one or more API actions associated with the cloud service. The one or more processors may be configured to determine respective security category information and respective security risk scores for the one or more API actions. The one or more processors may be configured to generate, based on the respective security category information and the respective security risk scores for the one or more API actions, security risk mitigation information. The one or more processors may be configured to cause, based on the security risk mitigation information, one or more actions to be performed.

Some implementations described herein relate to a non-transitory computer-readable medium that stores a set of instructions. The set of instructions, when executed by one or more processors of a system for cloud service security risk assessment, may cause the system for cloud service security risk assessment to identify one or more API actions associated with a cloud service. The set of instructions, when executed by one or more processors of the system for cloud service security risk assessment, may cause the system for cloud service security risk assessment to determine at least one of respective security category information for the one or more API actions or respective security risk scores for the one or more API actions. The set of instructions, when executed by one or more processors of the system for cloud service security risk assessment, may cause the system for cloud service security risk assessment to generate, based on the at least one of the respective security category information for the one or more API actions or the respective security risk scores for the one or more API actions, security risk mitigation information. The set of instructions, when executed by one or more processors of the system for cloud service security risk assessment, may cause the system for cloud service security risk assessment to cause, based on the security risk mitigation information, one or more actions to be performed.

Some implementations described herein relate to a method. The method may include determining, by a system for cloud service security risk assessment, at least one of security category information for an API action associated with a cloud service or a security risk score for the API action. The method may include generating, by the system and based on the at least one of the security category information for the API action or the security risk score for the API action, security risk mitigation information. The method may include causing, by the system and based on the security risk mitigation information, one or more actions to be performed.

DETAILED DESCRIPTION

Figure 1A:
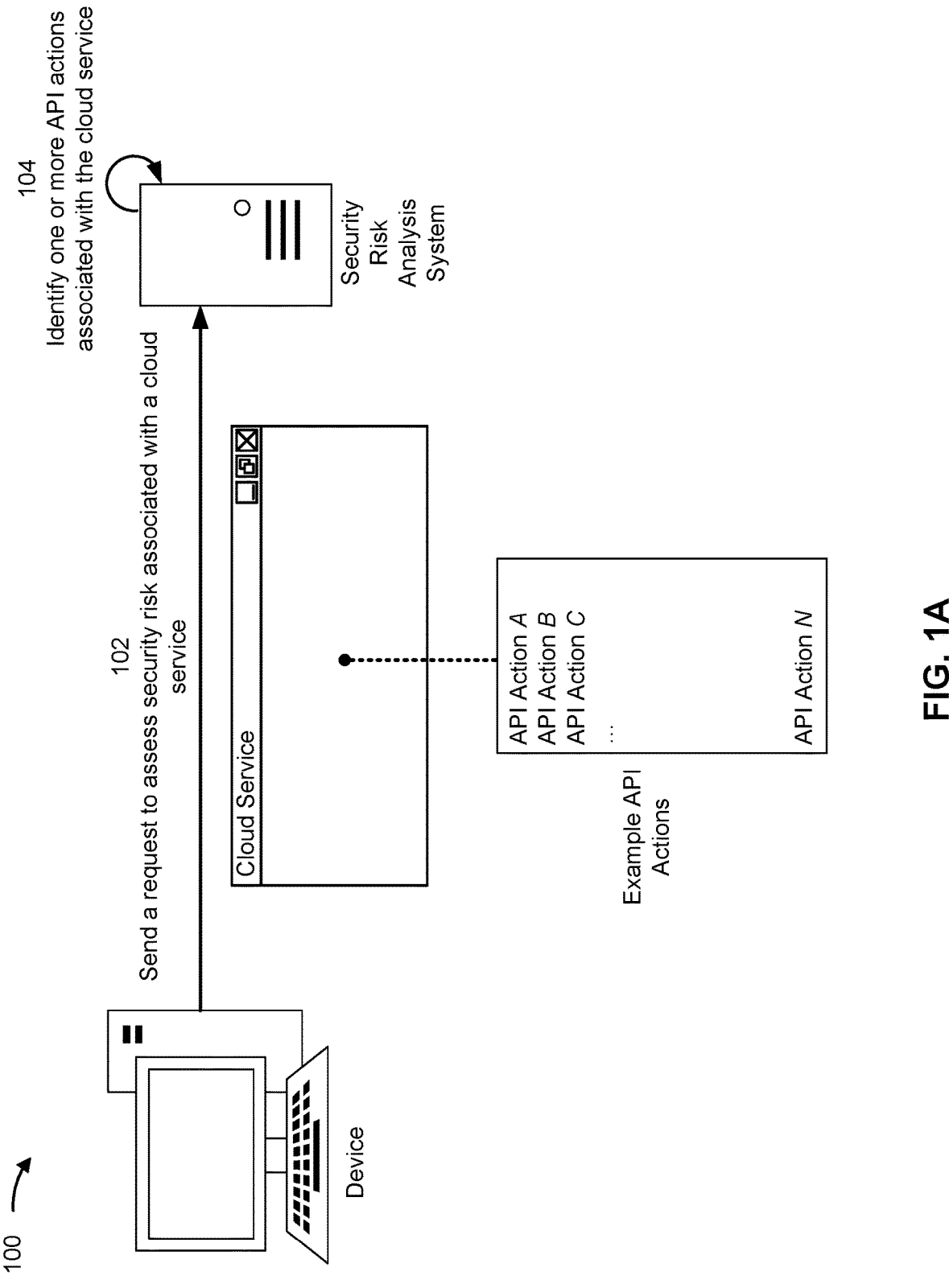
FIGS. 1A-1B are diagrams of an example associated with cloud service security risk assessment, in accordance with some embodiments of the present disclosure.

The following detailed description of example implementations refers to the accompanying drawings. The same reference numbers in different drawings may identify the same or similar elements.

Any cloud service that is to run in a cloud environment has a security risk (a combination of a likelihood of harm that results from unauthorized use of the cloud service and a potential magnitude of the harm, such as with respect to overall security and reliability of the cloud service and the cloud environment). In many cases, a device can use computing resources (e.g., processing resources, memory resources, communication resources, and/or power resources, among other examples) to analyze configuration information of the cloud service to estimate the cloud service's security risk. However, the configuration information often does not fully indicate the cloud service's behavior in operation, such as how, and/or what information, the cloud service communicates when operating. Consequently, a likelihood of determining an accurate security risk of the cloud service is low. Further, the security risk may depend on a security requirements profile associated with the cloud environment. For example, a first cloud environment (e.g., associated with a "high security" entity, such as a financial institution) may need to support data encryption at rest, while a second cloud environment (e.g., associated with a "low security" entity, such as a messaging platform) may not need to support data encryption at rest. Given these different security requirements, the likelihood of determining an accurate security risk of the cloud service (e.g., for the cloud environment in which the cloud service is, or is to be, deployed) is further reduced without considering the security requirements of the cloud environment.

Some implementations described herein include a security risk analysis system that identifies one or more API actions associated with a cloud service (e.g., that is, or is to be, deployed in a cloud environment). Each API action, of the one or more API actions, may be a specific operation that can be performed by the cloud service by making a request to an API endpoint associated with the cloud service (e.g., to retrieve information, to send information, to store information, to create a new resource, to modify a resource, and/or to delete a resource, among other examples). The security risk analysis system then determines respective security category information for the one or more API actions and/or respective security risk scores for the one or more API actions. For example, the security risk analysis system applies a machine learning model to each API action (e.g., to API action feature information associated with each API action) to determine security category information for the API action and/or a security risk score for the API action. The machine learning model may be trained to determine the security category information and/or the security risk score of an API action, such as based on a security requirements profile associated with the cloud environment, historical API actions, and security category determination information and/or security risk score determination information associated with the historical API actions.

In this way, the security risk analysis system determines respective security category information for the one or more API actions and/or respective security risk scores for the one or more API actions, and therefore computing resources (e.g., processing resources, memory resources, communication resources, and/or power resources, among other examples) of another device to estimate the cloud service's security risk (e.g., by only analyzing configuration information of the cloud service) are conserved. Further, the respective security category information for the one or more API actions and/or the respective security risk scores more accurately reflect (e.g., by considering API action capabilities and a security requirements profile of the cloud environment) a security risk of the cloud service (as compared to only analyzing configuration information of the cloud service).

Additionally, the security risk analysis system generates, based on the respective security category information for the one or more API actions and/or the respective security risk scores, security risk mitigation information. The security risk mitigation information may include, for example, one or more security risk mitigation recommendations (e.g., that indicate how the cloud service and/or the cloud environment may be configured to reduce a security risk associated with the one or more API actions of the cloud service), security risk mitigation code (e.g., that includes executable code that can be implemented within the cloud environment to reduce a security risk associated with the one or more API actions of the cloud service), security risk monitoring code (e.g., that includes executable code that can be implemented within a device, such as a device that includes a monitoring tool for monitoring the cloud environment, to monitor a security risk associated with the one or more API actions of the cloud service), and/or similar information.

The security risk analysis system then causes, based on the security risk mitigation information, one or more actions to be performed. As an example, the system may send the security risk mitigation information to a device, which may allow for presentation (e.g., on a display of a device) of the security risk mitigation information (e.g., the one or more security risk mitigation recommendations). In this way, a user of the device may be informed of the one or more security risk mitigation recommendations, which allows the user to determine whether to write security risk mitigation code (e.g., that is to be implemented in the cloud environment in which the cloud service is, or is to be, deployed), and/or to write security risk monitoring code (e.g., that is to be implemented by the device, or another device, to enable a monitoring tool to monitor a security risk associated with the cloud service in the cloud environment). As another example, the system may cause implementation of code that is included in the security risk mitigation information, such as the security risk mitigation code and/or the security risk monitoring code.

In this way, the security risk analysis system automatically allows cloud services with increased security risk to be quickly identified, analyzed, controlled, and/or monitored (e.g., based on the security risk mitigation information), which minimizes a likelihood of unauthorized use of the cloud service and/or a potential magnitude of harm that results from the unauthorized use of the cloud service. This improves an overall security and reliability of the cloud service and the cloud environment.

Further, because of automation, an amount of time to perform a security analysis of the cloud service is reduced (e.g., from months, or even years, to hours, or even minutes). This allows for a secure cloud service (or an updated version of the cloud service) to be quickly deployed to the cloud environment. This further improves an overall security and reliability of the cloud service and the cloud environment, such as by ensuring that the most up-to-date cloud service (e.g., with up-to-date security patch updates) is deployed in the cloud environment.

Figure 1B:
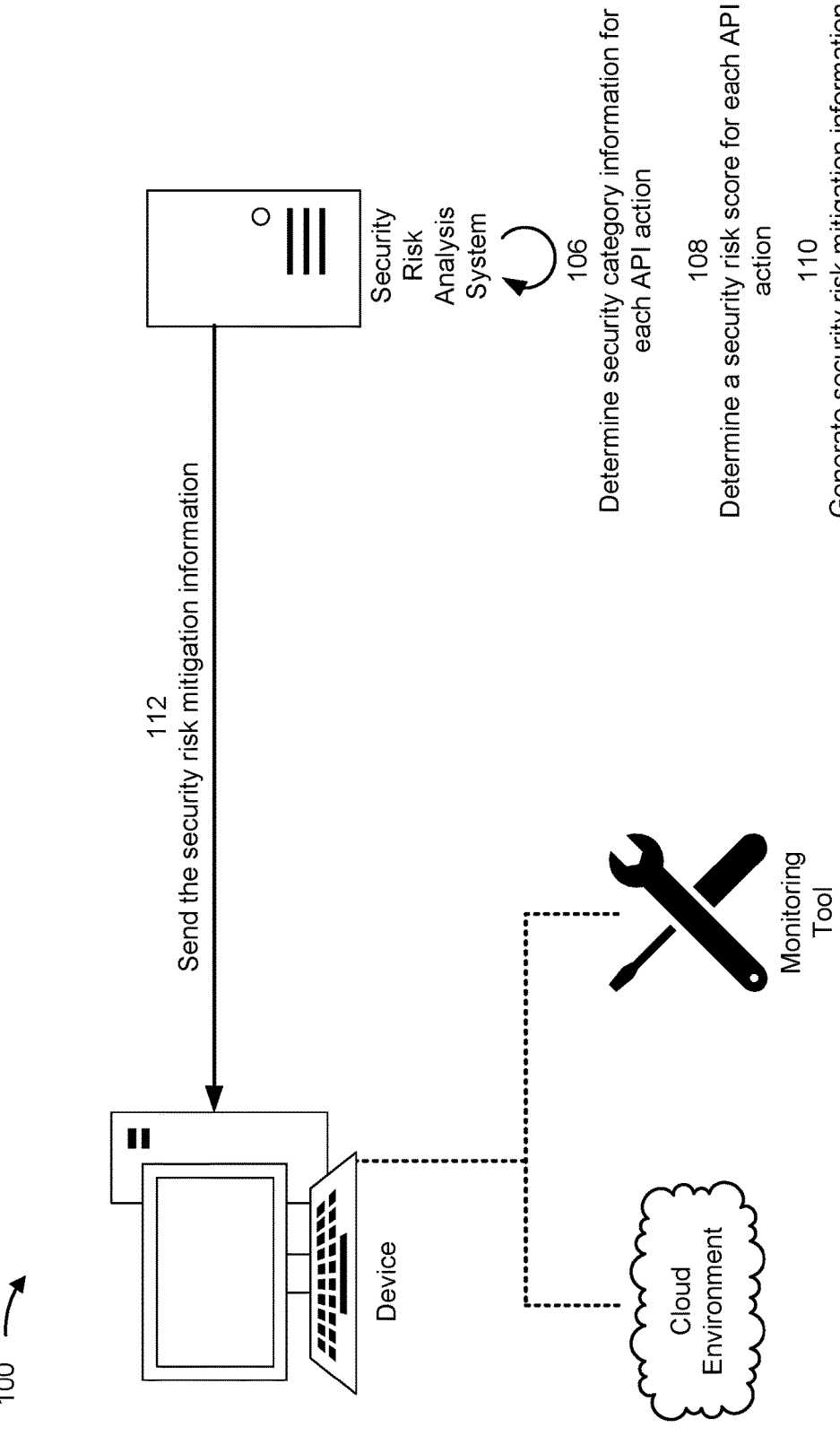

FIGS. 1A-1B are diagrams of an example 100 associated with cloud service security risk assessment. As shown in FIGS. 1A-1B, example 100 includes a device and a security risk analysis system. These devices are described in more detail in connection with FIGS. 3 and 4.

As shown in FIG. 1A, and by reference number 102, the device may send a request to assess security risk associated with a cloud service. The cloud service may include, for example, one or more programs designed to perform specific tasks and/or functions in a cloud environment (e.g., when the cloud service is deployed in the cloud environment). Security risk associated with the cloud service may be, for example, a combination of a likelihood of harm that results from unauthorized use of the cloud service and a potential magnitude of the harm (e.g., with respect to an operational integrity of the cloud service and/or the cloud environment, and/or to protection of associated data). In some implementations, the device may send the request to the security risk analysis system via a communication link between the device and the security risk analysis system. Accordingly, the security risk analysis system may obtain the request from the device (e.g., receive the request via the communication link).

As shown by reference number 104, the security risk analysis system may identify one or more API actions associated with the cloud service (e.g., based on the request to assess access security risk associated with the cloud service). For example, as shown in FIG. 1A, the cloud service may be associated with a plurality of API actions (shown as API actions A to N). Each API action, of the one or more API actions, may be a specific operation that can be performed by the cloud service by making a request to an API endpoint associated with the cloud service (e.g., to retrieve information, to send information, to store information, to create a new resource, to modify a resource, and/or to delete a resource, among other examples). In some implementations, the one or more API actions may include a set of API actions associated with the cloud service that are new (e.g., have not been previously analyzed by the security risk analysis system, as described herein) and/or that have been updated (e.g., have changed since a previous analysis by the security risk analysis system, as described herein). That is, the security risk analysis system may have previously analyzed API actions associated with one or more prior versions of the cloud service, and the security risk analysis system may identify one or more API actions that are associated with an updated version of the cloud service that were not included in, and/or are different than, the API actions associated with the one or more prior versions of the cloud service.

As shown in FIG. 1B, and by reference number 106, the security risk analysis system may determine security category information for each API action of the one or more API actions (e.g., based on the request to assess security risk associated with the application and/or based on identifying the one or more API actions). For example, the security risk analysis system may determine, for each API action of the one or more API actions, API action feature information (e.g., information that identifies one or more features of the API action, such as an API operation call, an API operation payload, an API location, and/or an API endpoint, among other examples). The security risk analysis system then may determine the security category information for the API action based on the API action feature information (e.g., by processing the API action feature information using one or more API action feature analysis techniques). The security category information may indicate, for example, an operation type of the API action (e.g., a retrieve information operation type, a send information operation type, a store information operation type, a create a new resource operation type, a modify a resource operation type, and/or a delete a resource operation type, among other examples), a security category associated with the API action (e.g., a public access security category, an external access security category, an internal access security category, a security configuration security category, a tagging security category, an encryption at rest security category, and/or an encryption in motion security category, among other examples), and/or other similar information.

Additionally, or alternatively, as shown by reference number 108, the security risk analysis system may determine a security risk score for each API action of the one or more API actions (e.g., based on the request to assess security risk associated with the application and/or based on identifying the one or more API actions). For example, the security risk analysis system may determine, for each API action of the one or more API actions, API action feature information. The security risk analysis system then may determine the security risk score for the API action based on the API action feature information (e.g., by processing the API action feature information using one or more API action feature analysis techniques). The security risk score may indicate, for example, a security risk associated with the API action (e.g., a value that indicates a combination of a likelihood of harm that results from use of the API action and a potential magnitude of the harm). In a specific example, each security risk score may have a value from 0 to 1 (e.g., greater than or equal to 0 and less than or equal to 1), where a higher security risk score (e.g., closer to 1 than 0) indicates more security risk for the corresponding API action, and a lower security risk score (e.g., closer to 0 than 1) indicates less security risk for the corresponding API action.

Accordingly, in some implementations, the security risk analysis system may determine at least one of respective security category information for the one or more API actions or respective security risk scores for the one or more API actions (e.g., based on respective API action feature information of the one or more API actions). In some implementations, for an API action, of the one or more API actions, the security risk analysis system may use a machine learning model to determine at least one of security category information or a security risk score for the API action. For example, the security risk analysis system may apply the machine learning model to the API action (e.g., to API action feature information associated with the API action) to determine the security category information for the API action and/or the security risk score for the API action. That is, the security risk analysis system may determine the security category information for the API action and/or the security risk score for the API action as machine learning model output of the machine learning model.

Figure 2:
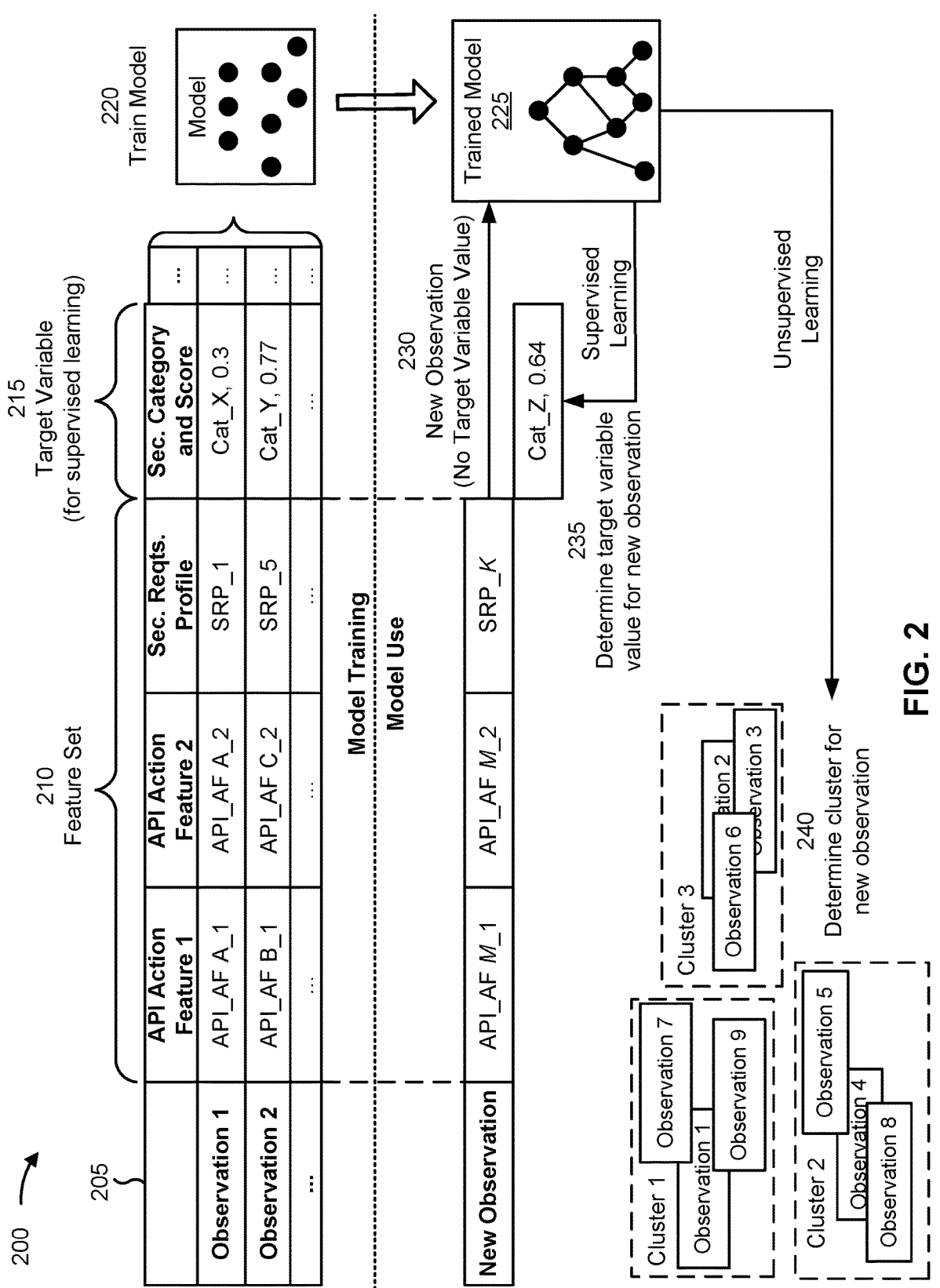
FIG. 2 is a diagram illustrating an example of training and using a machine learning model in connection with cloud service security risk assessment, in accordance with some embodiments of the present disclosure.

In one example, as described further in connection with FIG. 2, the machine learning model may be trained to determine the output (e.g., the security category information for the API action and/or the security risk score for the API action) based on a feature set that includes one or more features. For example, the machine learning model may be trained based on one or more security requirements profiles (e.g., that are associated with one or more cloud environments in which a cloud service may be deployed), API action feature information associated with a plurality of historical API actions (e.g., API action feature information associated with a plurality of historical API actions that have been previously analyzed), and at least one of security category determination information associated with the plurality of historical API actions (e.g., that indicates security category determinations for the plurality of historical API actions) or security risk score determination information associated with the plurality of historical API actions (e.g., that indicates security risk scores determinations for the plurality of historical API actions). Thus, the machine learning model may be trained to determine one or more associations and/or relationships between the one or more security requirements profile and the API action feature information associated with the plurality of historical API actions, and at least one of the security category determination information associated with the plurality of historical API actions or the security risk score determination information associated with the plurality of historical API actions.

As shown by reference number 110, the security risk analysis system may generate security risk mitigation information. For example, the security risk analysis system may generate the security risk mitigation information based on at least one of the respective security category information for the one or more API actions or the respective security risk scores for the one or more API actions (e.g., that were determined by the security risk analysis system, as described herein in relation to reference numbers 106 and 108). The security risk mitigation information may include, for example, one or more security risk mitigation recommendations (e.g., that indicate how the cloud service and/or the cloud environment may be configured to reduce a security risk associated with the one or more API actions of the cloud service), security risk mitigation code (e.g., that includes executable code that can be implemented within the cloud environment to reduce a security risk associated with the one or more API actions of the cloud service), security risk monitoring code (e.g., that includes executable code that can be implemented within a device, such as a device that includes a monitoring tool for monitoring the cloud environment, to monitor a security risk associated with the one or more API actions of the cloud service), and/or similar information.

In some implementations, the security risk analysis system may use a machine learning model (e.g., that is different than the machine learning model herein in relation to reference numbers 106 and 108) to generate the security risk mitigation information. For example, the security risk analysis system may apply the machine learning model to at least one of the respective security category information for the one or more API actions or the respective security risk scores for the one or more API actions to generate the security risk mitigation information. That is, the security risk analysis system may generate the security risk mitigation information as machine learning model output of the machine learning model.

In one example, in a similar manner as that described herein in connection with FIG. 2, the machine learning model may be trained to generate the output (e.g., the security risk mitigation information) based on a feature set that includes one or more features. For example, the machine learning model may be trained based on at least one of respective security category information associated with a plurality of historical API actions (e.g., security category information associated with a plurality of historical API actions that have been previously analyzed) or respective security risk scores associated with the plurality of historical API actions (e.g., security risk scores associated with the plurality of historical API actions that have been previously analyzed), and security risk mitigation information associated with the plurality of historical API actions (e.g., that was generated in association with previous analysis of the plurality of historical API actions). Thus, the machine learning model may be trained to determine one or more associations and/or relationships between the respective security category information associated with the plurality of historical API actions and/or the respective security risk scores associated with the plurality of historical API actions, and the security risk mitigation information associated with the plurality of historical API actions.

In some implementations, the risk analysis system may cause one or more actions to be performed (e.g., based on the security risk mitigation information that is associated with the one or more API actions of the cloud service). For example, as shown by reference number 112, the security risk analysis system may send the security risk mitigation information to the device. The security risk analysis system may send the security risk mitigation information to the device via the communication link between the device and the security risk analysis system. Accordingly, the device may obtain the security risk mitigation information from the security risk analysis system (e.g., receive the security risk mitigation information via the communication link).

Sending the security risk mitigation information to the device may allow for presentation of the security risk mitigation information (e.g., via a display of the device). For example, when the security risk mitigation information includes one or more security risk mitigation recommendations, the device may process (e.g., parse and/or read) the security risk mitigation information to identify the one or more security risk mitigation recommendations, and may cause the one or more security risk mitigation recommendations to be presented via the display of the device (e.g., via a graphical user interface (GUI) associated with the display of the device). In this way, a user of the device may be informed of the one or more security risk mitigation recommendations, which may allow the user to determine whether to write security risk mitigation code (e.g., that is to be implemented in the cloud environment in which the cloud service is, or is to be, deployed), and/or to write security risk monitoring code (e.g., that is to be implemented by the device, or another device, to enable a monitoring tool to monitor a security risk associated with the cloud service in the cloud environment).

Additionally, or alternatively, sending the security risk mitigation information to the device may allow for implementation of code that is included in the security risk mitigation information. For example, when the security risk mitigation information includes security risk mitigation code, the device may process (e.g., parse and/or read) the security risk mitigation information to identify the security risk mitigation code, and may cause the security risk mitigation code to be implemented in the cloud environment associated with the cloud service. As another example, when the security risk mitigation information includes security risk monitoring code, the device may process (e.g., parse and/or read) the security risk mitigation information to identify the security risk monitoring code, and may cause the security risk monitoring code to be implemented (e.g., in the device, or another device, with a monitoring tool for monitoring the cloud environment) in association with monitoring the cloud service (e.g., when deployed in the cloud environment).

As indicated above, FIGS. 1A-1B are provided as an example. Other examples may differ from what is described in connection with FIGS. 1A-1B.

FIG. 2 is a diagram illustrating an example 200 of training and using a machine learning model in connection with cloud service security risk assessment. The machine learning model training and usage described herein may be performed using a machine learning system. The machine learning system may include or may be included in a computing device, a server, a cloud computing environment, or the like, such as the security risk analysis system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the security risk analysis system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the security risk analysis system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of API action feature 1 (shown as "API Action Feature 1") of an API action, a second feature of API action feature 2 (shown as "API Action Feature 2") of an API action, a third feature of security requirements profile (shown as "Sec. Reqts. Profile") associated with a cloud environment, and so on. As shown, for a first observation, the first feature may have a value of API_AF A_1 (for an API action A), the second feature may have a value of API_AF A_2 (for the API action A), the third feature may have a value of SRP_1 (for a cloud environment 1), and so on. These features and feature values are provided as examples, and may differ in other examples. For example, the feature set may include one or more features associated with API action features and/or security requirements profiles.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is security category information (shown as "Sec. Category") and security risk score (shown as "Score"), which has a value of Cat_X, 0.3 for the first observation, where the Cat_X security category information indicates an operation type and/or a security category of the API action A, and the category score 0.3 indicates a security risk (on a scale from 0 to 1) associated with the API action A.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, using a neural network algorithm, the machine learning system may train a machine learning model to output (e.g., at an output layer) security category information and a security risk score based on an input (e.g., one or more API action features of an API action and a security requirements profile), as described elsewhere herein. In particular, the machine learning system, using the neural network algorithm, may train the machine learning model, using the set of observations from the training data, to derive weights for one or more nodes in the input layer, in the output layer, and/or in one or more hidden layers (e.g., between the input layer and the output layer). Nodes in the input layer may represent features of a feature set of the machine learning model, such as a first node representing an API action feature 1, a second node representing an API action feature 2, a third node representing a security requirements profile, and so forth. One or more nodes in the output layer may represent output(s) of the machine learning model, such as a node indicating the security category information and the security risk score. The weights learned by the machine learning model facilitate transformation of the input of the machine learning model to the output of the machine learning model. After training, the machine learning system may store the machine learning model as a trained machine learning model 225 to be used to analyze new observations.

As an example, the machine learning system may obtain training data for the set of observations based on one or more security requirements profiles (e.g., that are associated with one or more cloud environments in which a cloud service may be deployed), API action feature information associated with a plurality of historical API actions (e.g., API action feature information associated with a plurality of historical API actions that have been previously analyzed), and at least one of security category determination information associated with the plurality of historical API actions (e.g., that indicates security category determinations for the plurality of historical API actions) or security risk score determination information associated with the plurality of historical API actions (e.g., that indicates security risk scores determinations for the plurality of historical API actions). For example, the machine learning system may obtain the training data from one or more databases associated with the security risk analysis system and/or another device.

As shown by reference number 230, the machine learning system may apply the trained machine learning model 225 to a new observation, such as by receiving a new observation and inputting the new observation to the trained machine learning model 225. As shown, the new observation may include a first feature with a value of API_AF M_1 (for an API action M), a second feature with a value of API_AF M_2 (for the API action M), a third feature with a value of SRP_K, (for a cloud environment K) and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of Cat_Z, 0.64 for the target variable of security category information and security risk score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a security risk mitigation recommendation. The first automated action may include, for example, causing an action indicated by the security risk mitigation recommendation to be performed.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a high security risk cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a low security risk cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an indication of whether the predict value is accurate.

In this way, the machine learning system may apply a rigorous and automated process to determine security category information and a security risk score of an API action. The machine learning system may enable recognition and/or identification of tens, hundreds, thousands, or millions of features and/or feature values for tens, hundreds, thousands, or millions of observations, thereby increasing accuracy and consistency and reducing delay associated with determining security category information and a security risk score of an API action relative to requiring computing resources to be allocated for tens, hundreds, or thousands of operators to manually determine security category information and a security risk score of an API action using the features or feature values.

As indicated above, FIG. 2 is provided as an example. Other examples may differ from what is described in connection with FIG. 2.

Figure 3:
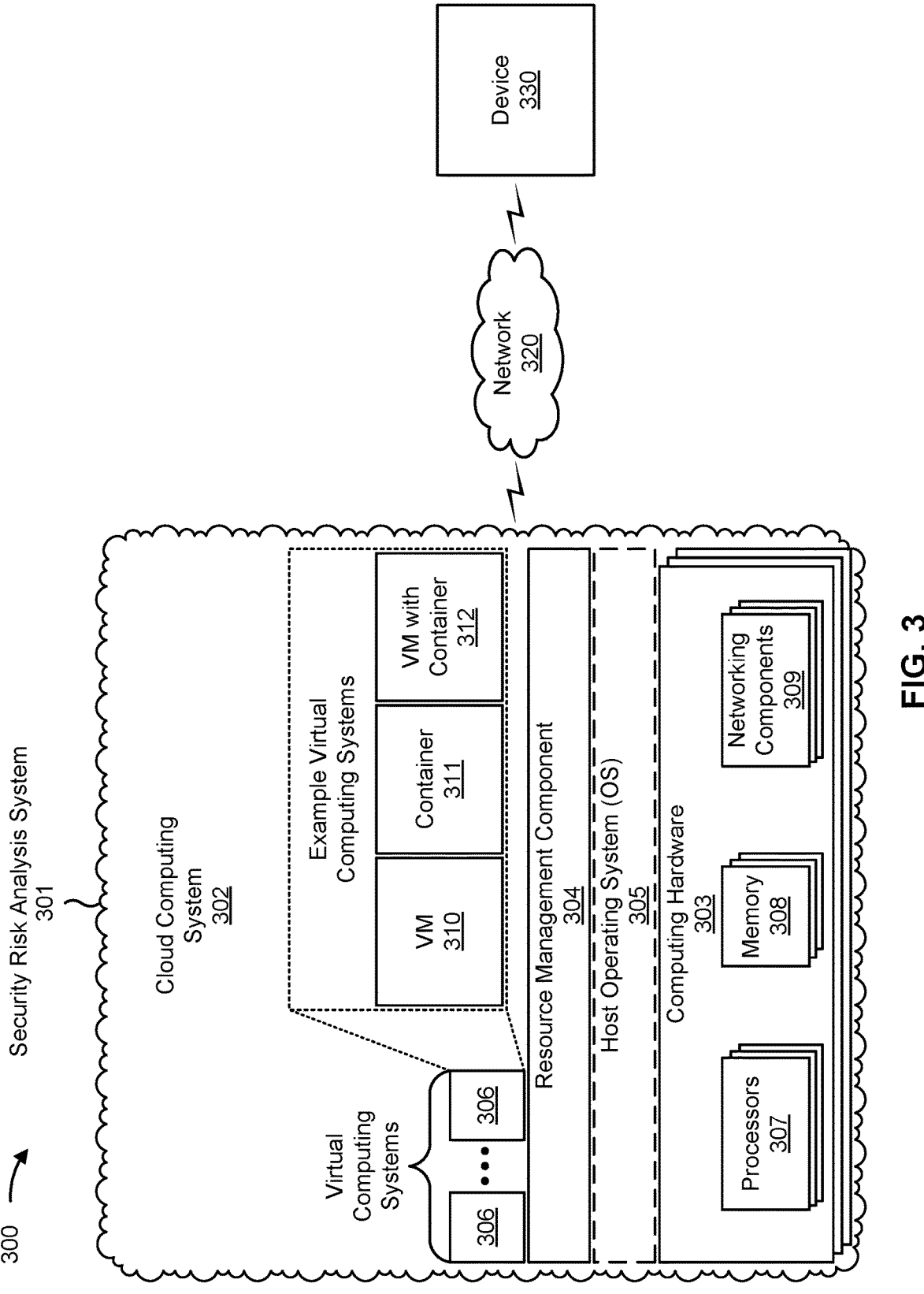
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a security risk analysis system 301, which may include one or more elements of and/or may execute within a cloud computing system 302. The cloud computing system 302 may include one or more elements 303-312, as described in more detail below. As further shown in FIG. 3, environment 300 may include a network 320, and/or a device 330. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the security risk analysis system 301 may include one or more elements 303-312 of the cloud computing system 302, may execute within the cloud computing system 302, and/or may be hosted within the cloud computing system 302, in some implementations, the security risk analysis system 301 may not be cloud-based (e.g., may be implemented outside of a cloud computing system) or may be partially cloud-based. For example, the security risk analysis system 301 may include one or more devices that are not part of the cloud computing system 302, such as device 400 of FIG. 4, which may include a standalone server or another type of computing device. The security risk analysis system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The device 330 may include one or more devices capable of receiving, generating, storing, processing, and/or providing information associated with cloud service security risk assessment, as described elsewhere herein. The device 330 may include a communication device and/or a computing device. For example, the device 330 may include a wireless communication device, a mobile phone, a user equipment, a laptop computer, a tablet computer, a desktop computer, or a similar type of device. As another example, the device 330 may include a server, such as an application server, a client server, a web server, a database server, a host server, a proxy server, a virtual server (e.g., executing on computing hardware), or a server in a cloud computing system. In some implementations, the device 330 may include computing hardware used in a cloud computing system.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
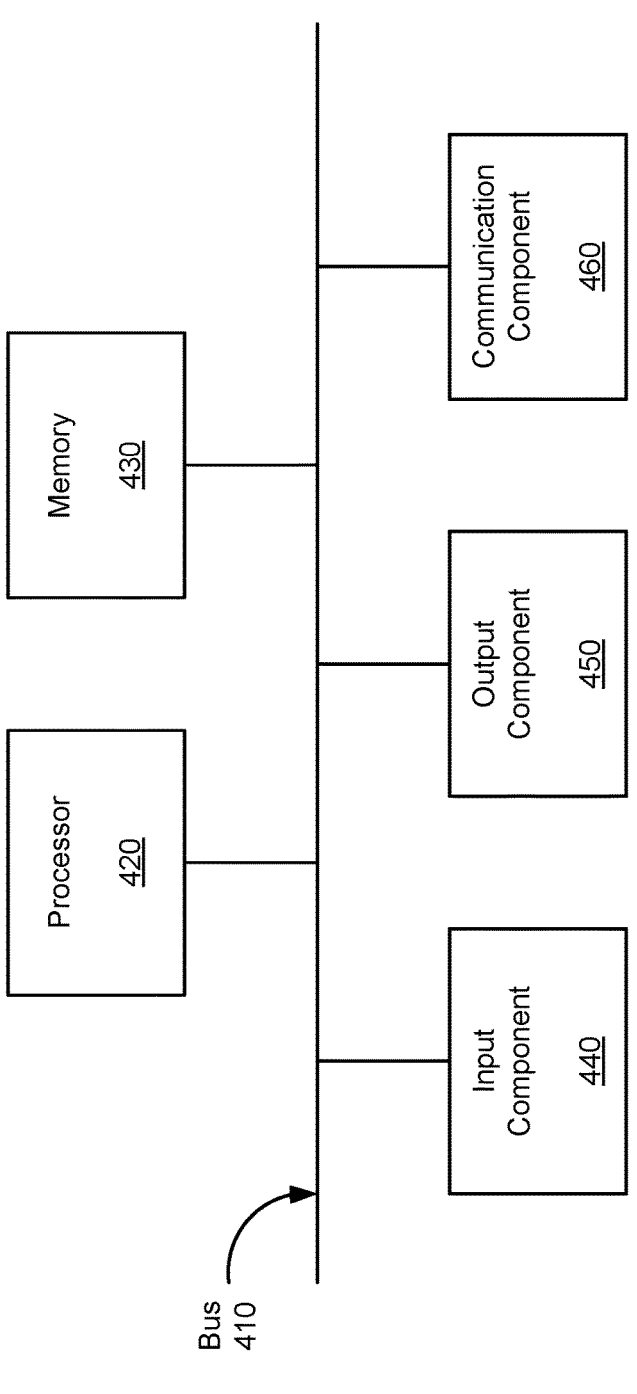
FIG. 4 is a diagram of example components of a device associated with cloud service security risk assessment, in accordance with some embodiments of the present disclosure.

FIG. 4 is a diagram of example components of a device 400 associated with cloud service security risk assessment. The device 400 may correspond to security risk analysis system 301, computing hardware 303, and/or device 330. In some implementations, security risk analysis system 301, computing hardware 303, and/or device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
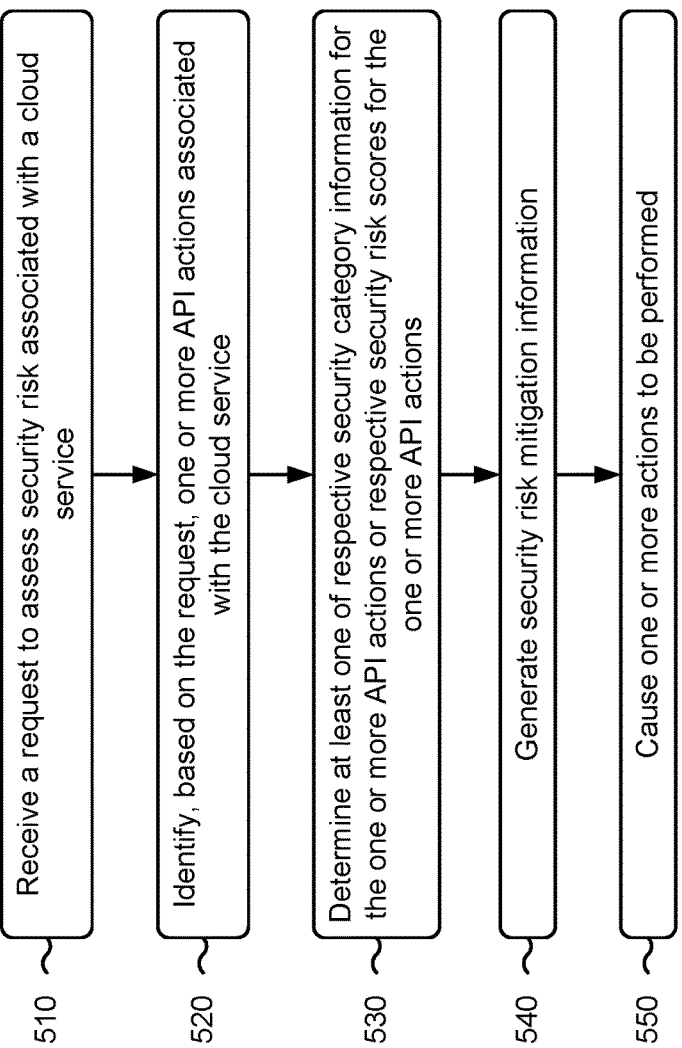
FIG. 5 is a flowchart of an example process associated with cloud service security risk assessment, in accordance with some embodiments of the present disclosure.

FIG. 5 is a flowchart of an example process 500 associated with cloud service security risk assessment. In some implementations, one or more process blocks of FIG. 5 may be performed by the security risk analysis system 301. In some implementations, one or more process blocks of FIG. 5 may be performed by another device or a group of devices separate from or including the security risk analysis system 301, such as the device 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a request to assess security risk associated with a cloud service (block 510). For example, the security risk analysis system 301 (e.g., using processor 420, memory 430, input component 440, and/or communication component 460) may receive a request to assess security risk associated with a cloud service, as described above in connection with reference number 102 of FIG. 1A. As an example, the security risk analysis system 301 may obtain the request from the device 330.

As further shown in FIG. 5, process 500 may include identifying one or more API actions associated with the cloud service (block 520). For example, the security risk analysis system 301 (e.g., using processor 420 and/or memory 430) may identify one or more API actions associated with the cloud service, as described above in connection with reference number 104 of FIG. 1A. As an example, the security risk analysis system 301 may identify one or more API actions associated with the cloud service based on the request.

As further shown in FIG. 5, process 500 may include determining at least one of respective security category information for the one or more API actions or respective security risk scores for the one or more API actions (block 530). For example, the security risk analysis system 301 (e.g., using processor 420 and/or memory 430) may determine at least one of respective security category information for the one or more API actions or respective security risk scores for the one or more API actions, as described above in connection with reference numbers 106 and 108 of FIG. 1B. As an example, the security risk analysis system may use a machine learning model to determine at least one of respective security category information for the one or more API actions or respective security risk scores for the one or more API actions.

As further shown in FIG. 5, process 500 may include generating security risk mitigation information (block 540). For example, the security risk analysis system 301 (e.g., using processor 420 and/or memory 430) may generate security risk mitigation information, as described above in connection with reference number 110 of FIG. 1B. As an example, the security risk analysis system 301 may generate security risk mitigation information based on at least one of the respective security category information for the one or more API actions or the respective security risk scores.

As further shown in FIG. 5, process 500 may include causing one or more actions to be performed (block 550). For example, the security risk analysis system 301 (e.g., using processor 420 and/or memory 430) may cause, based on the security risk mitigation information, one or more actions to be performed, as described above in connection with reference number 112 of FIG. 1B. As an example, the security risk analysis system 301 may send the security risk mitigation information to the device 330, which may allow for presentation of the security risk mitigation information or implementation of code that is included in the security risk mitigation information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for cloud service security risk assessment, the system comprising:
  one or more memories; and
  one or more processors, communicatively coupled to the one or more memories, configured to:
    receive a request to assess security risk associated with a cloud service;
    identify, based on the request, one or more application programming interface (API) actions associated with the cloud service;
    determine respective security category information and respective security risk scores for the one or more API actions by applying a machine learning model to API action feature information associated with the one or more API actions;
    generate, based on the respective security category information and the respective security risk scores for the one or more API actions, security risk mitigation information; and
    cause, based on the security risk mitigation information, one or more actions to be performed.

2. The system of claim 1, wherein the one or more processors, to determine the respective security category information and the respective security risk scores for the one or more API actions, are configured to:
    determine, for each API action of the one or more API actions, respective API action feature information; and
    determine security category information and a security risk score for each API action of the one or more API actions by applying the machine learning model to the respective API action feature information.

3. The system of claim 2, wherein the machine learning model is trained based on a security requirements profile, API action feature information associated with a plurality of historical API actions, security category determination information associated with the plurality of historical API actions, and security risk score determination information associated with the plurality of historical API actions.

4. The system of claim 1, wherein the one or more processors, to generate the security risk mitigation information, are configured to:
    generate the security risk mitigation information by applying a machine learning model to the respective security category information and the respective security risk scores for the one or more API actions.

5. The system of claim 1, wherein the security risk mitigation information includes one or more security risk mitigation recommendations, and
    wherein the one or more processors, to cause the one or more actions to be performed, are configured to:
        send, to a device, the security risk mitigation information,
            wherein sending the security risk mitigation information to the device allows the device to present the one or more security risk mitigation recommendations via a display of the device.

6. The system of claim 1, wherein the security risk mitigation information includes security risk mitigation code, and
    wherein the one or more processors, to cause the one or more actions to be performed, are configured to:
        send, to a device, the security risk mitigation information,
            wherein sending the security risk mitigation information allows the device to implement the security risk mitigation code in a cloud environment associated with the cloud service.

7. The system of claim 1, wherein the security risk mitigation information includes security risk monitoring code, and
    wherein the one or more processors, to cause the one or more actions to be performed, are configured to:
        send, to a device, the security risk mitigation information,
            wherein sending the security risk mitigation information allows the device to implement the security risk monitoring code in association with monitoring the cloud service.

8. A non-transitory computer-readable medium storing a set of instructions, the set of instructions comprising:
    one or more instructions that, when executed by one or more processors of a system for cloud service security risk assessment, cause the system to:
        identify one or more application programming interface (API) actions associated with a cloud service;
        determine respective security category information for the one or more API actions and respective security risk scores for the one or more API actions by applying a machine learning model to API action feature information associated with the one or more API actions;

generate, based on the respective security category information for the one or more API actions and the respective security risk scores for the one or more API actions, security risk mitigation information; and cause, based on the security risk mitigation information, one or more actions to be performed.

9. The non-transitory computer-readable medium of claim 8, wherein the one or more instructions, that cause the system to determine the respective security category information for the one or more API actions and the respective security risk scores for the one or more API actions, cause the system to:

determine, for each API action of the one or more API actions, respective API action feature information; and determine at least one of security category information or a security risk score for each API action of the one or more API actions by applying the machine learning model to the respective API action feature information.

10. The non-transitory computer-readable medium of claim 9, wherein the machine learning model is trained based on a security requirements profile, API action feature information associated with a plurality of historical API actions, and at least one of security category determination information associated with the plurality of historical API actions or security risk score determination information associated with the plurality of historical API actions.

11. The non-transitory computer-readable medium of claim 8, wherein the one or more instructions, that cause the system to generate the security risk mitigation information, cause the system to:

generate the security risk mitigation information by applying a machine learning model to the respective security category information for the one or more API actions and the respective security risk scores for the one or more API actions.

12. The non-transitory computer-readable medium of claim 8, wherein the security risk mitigation information includes one or more security risk mitigation recommendations, and wherein the one or more instructions, that cause the system to cause the one or more actions to be performed, cause the system to:

send, to a device, the security risk mitigation information to allow for presentation of the one or more security risk mitigation recommendations by the device.

13. The non-transitory computer-readable medium of claim 8, wherein the security risk mitigation information includes security risk mitigation code, and wherein the one or more instructions, that cause the system to cause the one or more actions to be performed, cause the system to:

send, to a device, the security risk mitigation information to allow for implementation of the security risk mitigation code in a cloud environment associated with the cloud service.

14. The non-transitory computer-readable medium of claim 8, wherein the security risk mitigation information includes security risk monitoring code, and wherein the one or more instructions, that cause the system to cause the one or more actions to be performed, cause the system to:

send, to a device, the security risk mitigation information to allow for implementation of the security risk monitoring code in association with monitoring the cloud service.

15. A method, comprising:

determining, by a system for cloud service security risk assessment, security category information for an application programming interface (API) action associated with a cloud service and a security risk score for the API action by applying a machine learning model to API action feature information associated with the API action;

generating, by the system and based on the security category information for the API action and the security risk score for the API action, security risk mitigation information; and causing, by the system and based on the security risk mitigation information, one or more actions to be performed.

16. The method of claim 15, wherein determining the security category information for the API action and the security risk score for the API action comprises:

determining the API action feature information associated with the API action.

17. The method of claim 15, wherein generating the security risk mitigation information comprises:

generating the security risk mitigation information by applying a machine learning model to the security category information for the API action and the security risk score for the API action.

18. The method of claim 15, wherein the security risk mitigation information includes one or more security risk mitigation recommendations, and wherein causing the one or more actions to be performed comprises:

send, to a device, the security risk mitigation information to allow for presentation of the one or more security risk mitigation recommendations.

19. The method of claim 15, wherein the security risk mitigation information includes security risk mitigation code, and wherein causing the one or more actions to be performed comprises:

sending, to a device, the security risk mitigation information to allow for implementation of the security risk mitigation code in association with the cloud service.

20. The method of claim 15, wherein the security risk mitigation information includes security risk monitoring code, and wherein causing the one or more actions to be performed comprises:

sending, to a device, the security risk mitigation information to allow for implementation of the security risk monitoring code in association with monitoring the cloud service.

* * * * *